(12) United States Patent
Doering et al.

(10) Patent No.: US 11,859,962 B2
(45) Date of Patent: Jan. 2, 2024

(54) METHOD FOR EXAMINING A COATING OF A PROBE SURFACE

(71) Applicant: BASF Coatings GmbH, Münster (DE)

(72) Inventors: Rolf Doering, Münster (DE); Torsten Engelmann, Münster (DE); Michael Freitag, Münster (DE); Susanne Behrens, Münster (DE); Peter Stockbrink, Münster (DE); Nils Tegethoff, Münster (DE); Karin Eckert, Münster (DE); Jutta Kersting, Münster (DE)

(73) Assignee: BASF COATINGS GMBH, Muenster (DE)

( * ) Notice: Subject to any disclaimer, the term of this patent is extended or adjusted under 35 U.S.C. 154(b) by 27 days.

(21) Appl. No.: 17/603,159

(22) PCT Filed: Apr. 9, 2020

(86) PCT No.: PCT/EP2020/060244
§ 371 (c)(1),
(2) Date: Oct. 12, 2021

(87) PCT Pub. No.: WO2020/208180
PCT Pub. Date: Oct. 15, 2020

(65) Prior Publication Data
US 2022/0196389 A1 Jun. 23, 2022

(30) Foreign Application Priority Data
Apr. 12, 2019 (EP) .................................... 19169102

(51) Int. Cl.
*G01B 11/06* (2006.01)
*G01B 9/02* (2022.01)
*G01B 11/24* (2006.01)

(52) U.S. Cl.
CPC ...... *G01B 11/0675* (2013.01); *G01B 9/02047* (2013.01); *G01B 11/2441* (2013.01)

(58) Field of Classification Search
CPC .... G01B 9/021; G01B 9/023; G01B 9/02047; G01B 11/0675; G01B 11/2441;
(Continued)

(56) References Cited

U.S. PATENT DOCUMENTS

| 4,443,106 A | * | 4/1984 | Yasuda | .............. | G01B 11/0675 |
| | | | | | 73/150 R |
| 5,041,726 A | * | 8/1991 | Chang | .................... | G01B 9/021 |
| | | | | | 250/341.8 |

(Continued)

FOREIGN PATENT DOCUMENTS

| JP | H08304253 A | 11/1996 | | |
| JP | 2009509150 A | * 3/2009 | ............. | G01B 11/25 |

(Continued)

OTHER PUBLICATIONS

"Paints and varnishes—Determination of stone-chip resistance of coatings—Part 1: Multi-impact testing". International Standard, ISO 20567-1, Feb. 15, 2005. (Year: 2005).*

(Continued)

*Primary Examiner* — Michael A Lyons
(74) *Attorney, Agent, or Firm* — Armstrong Teasdale LLP

(57) ABSTRACT

Described herein is a method for examining a coating of a probe surface, including the steps of providing sensing data indicative of a depth of the coating at each of a predetermined subset of probe surface points, determining a depth representation of the coating from the sensing data, and deriving a coating property based on the depth representation. The coating property carries objective information about a geometric constitution or structure of the coating, which can be used for assessing the coating with respect to (Continued)

a functionality that is due to its geometric constitution or structure.

15 Claims, 6 Drawing Sheets

(58) Field of Classification Search
CPC ......... G03H 1/0443; G03H 2001/0445; G03H 2001/0447; G03H 2001/0452; G03H 2001/005; G01N 33/22
See application file for complete search history.

(56) References Cited

U.S. PATENT DOCUMENTS

| | | | |
|---|---|---|---|
| 8,300,232 B2 * | 10/2012 | Sansom | G01B 11/0616 356/485 |
| 9,488,470 B1 | 11/2016 | Peterson et al. | |
| 2009/0219515 A1 | 9/2009 | Spennemann et al. | |
| 2013/0045663 A1 | 2/2013 | Galletti et al. | |
| 2015/0226953 A1 * | 8/2015 | Lee | G06T 7/40 382/108 |
| 2019/0137256 A1 * | 5/2019 | Trenholm | G01B 9/02063 |

FOREIGN PATENT DOCUMENTS

| | | | |
|---|---|---|---|
| JP | 2009509150 A | 3/2009 | |
| WO | WO-2012099220 A1 * | 7/2012 | ............. G01B 11/25 |

OTHER PUBLICATIONS

Budini, N. et al. "Characterization of drying paint coatings by dynamic speckle and holographic interferometry measurements". Applied Optics, vol. 55, No. 17, Jun. 10, 2016, pp. 4706-4712. (Year: 2016).*

International Search Report and Written Opinion for corresponding PCT/EP2020/060244 dated Aug. 18, 2020, 15 Pages.

* cited by examiner

METHOD FOR EXAMINING A COATING OF A PROBE SURFACE

CROSS-REFERENCE TO RELATED APPLICATIONS

This application is a U.S. National Phase Application of International Patent Application No. PCT/EP2020/060244, filed Apr. 9, 2020, which claims priority to European Patent Application No. 19169102.1, filed Apr. 12, 2019, the entire contents of which are hereby incorporated by reference herein.

FIELD OF THE INVENTION

The present invention relates to a method and an examining device for examining a coating of a probe surface, and further to a method and a system for performing impact tests on a coating of a probe surface.

BACKGROUND OF THE INVENTION

Various kinds of coatings are used in many fields of technology for endowing a surface, such as a surface of a single part of a machine or even of a whole product with a desired functionality. Such a functionality may consist in providing a protection for bulk material underlying the coating, or it may consist in endowing the coated part with additional properties. While protection might be improved against corrosion or chemical influences, additional features may consist in a directed guidance of light, in designable reflection properties, in an improved hydrodynamic behavior or in a change of barrier or transmissive characteristics for certain substances. The types of coating generally used include those which are liquid before bringing them into contact with a bulk material's surface, such as gloss paints or varnishes, and those which are already hardened beforehand, such as films or foils, which in turn might again be endowed with further, typically polymer coatings. Polymer coatings can either be applied in liquid or in powder form. Further important classes of coatings comprise electrically applied galvanic coatings and passivating coatings both electrically or chemically applicable.

In any case, in order to verify certain attributed functionalities of coatings, or, more generally, for measuring features of interest, it is an obvious prerequisite in development, production and quality control to possess appropriate examining and testing means for coatings. Since the results of such examinations and tests are interpreted as defining features for the respective coating or coated products, and since these defining features need to be communicated across production sites and companies, the examination and testing means are typically designed to yield results that are as objective and reproducible as possible and hence comparable to each other. Common efforts for achieving such comparability are manifested in terms of public standards, such as published by the German Institute for Standardization (DIN) and/or the International Organization for Standardization (ISO), or corporate standards, which are adapted to specific needs of manufacturers.

In some cases, however, even the test procedures agreed upon in commonly accepted standards still rely on human evaluation of test results. This is the case, for instance, in the DIN EN ISO 20567-1 standard chip impact tests for evaluating the mechanical resistance of coatings, as widely used in the automobile industry, for instance. In these tests, a sample of stone or steel chips of a predetermined type is shot at bulk material probes whose surface has been provided with a coating of interest, often a gloss paint or varnish. After being shot at, the probe is analyzed visually by an expert, and his or her visual impression of the coating, which has been damaged by the chips to different degrees at different locations, is being matched to standardized images of damaged probes, each being representative of a separate resistance class. But, even the most well-trained experts will not always agree upon which class a given test result belongs in. Furthermore, it is likely that the more careful an expert aims to classify a test result, the more time it will take him or her. However, quality control typically needs to be performed under high time pressure, in particular if a high number of probes is to be tested, which is not unusual. The time pressure is even higher when the quality of certain parts of a machine need to be assessed during an on-going production process. Desirable would therefore be a method for examining coatings that allows for acquiring less subjective results in less time.

Some assessment schemes also rely on the evaluation of the severeness of single impacts. Therein, the severeness of a single impact is commonly judged by its apparent color, which is based on the assumption that more severe impacts will leave deeper and/or larger impacts. This assumption, of course, relies on a perceivable color difference between layers. If the layers have the same color, the severeness of a single defect can thus not be determined. Desirable would therefore also be a method for examining coatings that allows for assessing single mechanical impacts even if the coating layers share the same color.

The article of Budini et al: "Applied Optics—Characterization of drying paint coatings by dynamic speckle and holographic interferometry measurements", refers to dynamic speckle and holographic interferometry techniques to characterize the drying process of solvent-based paint coatings.

US 2013/0045663 A1 refers to apparatuses that are used for optically measuring by interferometry the thickness of an object such as a slice of semiconductor material. Readings of the object thickness by optical interferometry can be carried out, rough thickness values can be obtained and frequencies, indicating how often the rough thickness values occur, can be evaluated.

U.S. Pat. No. 9,488,470 B1 refers to a method for evaluating the condition of a ceramic coating deposited on a substrate. The method comprises illuminating the ceramic coating with light, measuring the intensity of light returned from the ceramic coating as function of depth in the coating and transverse position on the coating, and analyzing the measured light intensities to obtain, for instance, an intensity of the light returned from the exposed coating surface relative to the intensity of light returned from the coating.

SUMMARY OF THE INVENTION

It is therefore regarded as an object of the present invention to provide a method and a device for examining a coating of a probe surface objectively and in less time.

In a first aspect of the present invention, a method for examining a coating of a probe surface is provided that comprises the steps of a) providing sensing data indicative of a depth of the coating at each of a predetermined subset of probe surface points, b) determining a depth representation of the coating from the sensing data, and c) deriving a coating property based on the depth representation.

Since the provided sensing data indicate a depth of the coating at different points, the sensing data can be used for determining the depth representation of the coating. Since furthermore a coating property is derived, a property of the coating itself is obtained, and therefore an objective characteristic of the coating that is independent of any subjective evaluation and hence facilitates a reproducible assessment. Since an expert intervention is therefore no longer necessary, the speed of examination will also be increased, such as, for instance, by implementing the method on an automated system, like a computer. Moreover, since the coating property, i.e. the objective characteristic of the coating, is derived based on the depth representation of the coating, it carries objective information about a geometric constitution or structure of the coating, which can be used for assessing the coating with respect to a functionality that is due to its geometric constitution or structure.

In the context of the provided method, a probe is understood to be any piece of material having a surface onto which a coating is applicable, and which is capable of sustaining the method. In this sense, the probe can be, for instance, a part of a product, such as a piece cut out from a vehicle chassis, or some dummy substrate solely existent for supporting a coating to be examined. Preferably, the coating consists of one or multiple layers of a material or structure different from the probe, wherein the coating has a thickness which is substantially smaller than the thickness of the probe. While the probe surface is preferably understood to be part of the probe itself so that the coating forms a separate entity, the probe and the coating could alternatively be understood as forming a joint entity having a surface with a non-vanishing thickness comprising the coating and the probe surface. Examples of coatings include gloss paints and varnishes, preferably including those used in the automobile industry for protecting a chassis against stone chip impacts or scratches arising otherwise, such as car wash brushes, but also those employed in the furniture industry for the purpose of increasing a resistance of furniture against chemicals or weather influences. However, the coatings referred to herein also include those used in other areas and with other applications, such as films and foils as well as coatings of films and foils made from polymers, for instance, with the purpose of providing a microstructure desirable for various purposes.

The sensing data provided according to the method are data collected by any sensing device that is adapted to collect data indicative of a depth of the coating at a given point of the probe surface. Preferentially, a depth of the coating at a given probe surface point is the Euclidean distance from a selected reference plane to the point on the coating surface lying, in a direction perpendicular to the probe surface, above the given probe surface point. Therein, the coating surface is defined as the side of the coating facing away from the probe, i.e. forming an interface with an ambient medium, such as air. Similarly, it can be preferred that a depth of the coating at a given probe surface point is the Euclidean distance from a selected reference plane to a point in the interior of the coating lying, in a direction perpendicular to the probe surface, above the given probe surface point. In that case the depth is a partial depth. It can correspond, for instance, to a position of an interface between coating layers. If the reference plane is selected such that it substantially coincides with the coating surface in regions where the coating is regular, i.e., for instance, where it has not been damaged, the depth is a defect depth measuring an extent to which the coating deviates in a given region from a plane. In the case where the deviations stem from mechanical impacts of ballistic objects, such as chips used in standard testing procedures, the defect depth can also be referred to as a penetration depth. If, on the other hand, the reference plane is selected to substantially coincide with the probe surface, which is possible if the probe surface is substantially planar, then the depth could be referred to as a full depth, or thickness, of the coating. With that selection of a reference plane, a depth could also be a partial depth, which would indicate the Euclidean distance from the probe surface to a particular point within, i.e. in the interior of, the coating. Such a partial depth could also be understood as a height of the particular point above the probe surface. In particular, such a point of particular interest may lie at an interface between two layers of the coating. Of course, other choices of distance measure are possible for defining a depth in accordance with the present invention, including, in particular, other choices of references planes. Essentially, such choices will merely correspond to a choice of coordinates. In principle, any coordinate system could be used. Preferred coordinate systems are however adapted to the geometry of the probe and/or coating surface. For example, the coordinates can be coordinates of a Cartesian coordinate system of which two axes, say, the x-axis and y-axis, lie within a probe or coating surface, if the surface is planar. In that case, the third direction, say the z-direction, of the Cartesian coordinate system serves for measuring the depth of the coating. In other cases, where the probe surface and/or the coating surface are not planar, other coordinate systems and/or measures of depth may be preferred, defined, perhaps, with respect to references spheres instead of planes, and using spherical polar coordinates.

The sensing device may have a finite resolution, such that the number of probe surface points for which sensing data are provided may be limited, i.e. they may form a subset of the full set of probe surface points. Preferentially, this subset, or at least the number of points contained in it, is predetermined. The sensing device can be an optical device, such as a profilometer, a deflectometric device or even a conventional microscope. It is, however, particularly preferred that the sensing data are collected using a holographic device. Employing holography has the advantage that the sensing data do not only indicate depth information but also deliver information about optical properties of the coating, since phase information about the light used for sensing is not lost, at least not within some multiples of its wavelength.

In any case, from the provided sensing data three-dimensional information about the geometry of the coating can be obtained, as captured by the step of determining the depth representation. In a particularly simple case, where the sensing data may consist of the coating thicknesses at the subset of probe surface points, the depth representation may simply be a mapping of coordinates of probe surface points to the corresponding thickness values, i.e. full depths, of the coating. The depth representation could then be, for instance, a three-dimensional image or a two-dimensional projection of a three-dimensional image. Alternatively, the depth representation can be a two-dimensional map, coordinatized by the coordinates of the probe surface points, for instance, wherein the additional depth information is encoded in contours or in a color or grey shading. The depth representation may also be a combination, such as, for example, a two-dimensional projection of a three-dimensional image in which the depth information is additionally encoded in terms of a color or grey shading.

Irrespective of its visualization, the information carried by the depth representation is used for deriving a coating property, i.e. a property of the coating relating, for example, to its geometric characteristics, to a possible layering structure of the coating, or to one or more materials it comprises.

For example, a subjective degree of roughness of a coating surface, perceived haptically or visually, could be objectified by choosing the coating property to be a length scale characteristic for the variations in the coating surface geometry responsible for its roughness. Similarly, the coating property could objectively quantify an evenness of a coating surface geometry by measuring a deviation from a given reference geometry, or a degree of periodicity by indicating a length scale at which geometrical substructures reappear, which might be important for achieving certain functional properties of the coating. Moreover, if the coating has been treated in a well-defined and known manner before examination, the coating property can also yield information extending beyond the geometry per se, namely, for instance, about how the coating responds to the treatment applied. In other words, the information encoded by the depth representation can be interpreted using information relating to the past. In impact tests, for instance, defects are created in the coating, yielding a window into its interior, and therefore facilitating examination also of structural properties, such as a material composition of different layers. For validation of produced film coatings or even film coatings that are in the process of being applied, partial depth values can be used for assessing whether an internal structure of a coating, such as an interface between layers, has been formed acceptably.

In some embodiments of the method, the sensing data comprise holographic interferogram data indicative of an interaction of light with the coating, wherein the step of determining the depth representation comprises calculating reconstructed holographic interferogram data by applying a digital holographic reconstruction to the holographic interferogram data, and determining the depth representation of the coating based on the reconstructed holographic interferogram data. The holographic interferogram data are preferably data relating to an interference pattern generated by holographic means, wherein in that case the interaction of light with the coating would typically be a transmission/reflection of a beam of coherent light, such as can be generated by a laser, through/at a probe, a probe surface, or a coating overlying a probe surface.

Holographic means for generating such an interference pattern typically comprise a light source for generating a coherent or at least substantially coherent beam of light, and beam splitting means for splitting the generated beam into at least two beams, wherein one beam is commonly referred to as the object beam and the other beam is commonly referred to as the reference beam. The object beam then interacts in the above sense with an object, such as a coating, by reflection or transmission, and subsequently the object beam and the reference beam are being redirected by mirroring means such that they rejoin each other, forming a superposition beam. The mirroring means can comprise a mirror that is adapted to be adjustable and thereby change the distance that the reference beams travels, i.e. its pathlength, before superposition with the object beam. For instance, the mirroring means can comprise a standard reference mirror, as is used in standard holographic setups for adjusting the pathlength for a reference beam before superposition with an object beam.

The superposition beam is usually directed at a photosensitive medium. Since the object beam has interacted with the object, i.e. the coating in our case, it will carry a phase that is different from the phase of the reference beam upon superposition, implying that intensities of the superposition beam will vary in space when the superposition beam reaches the photosensitive medium. The photosensitive medium will record the spatially varying intensities in the form of an interference pattern, which can also be referred to as an interferogram. The interference pattern will further be affected by an adjusted pathlength of the reference beam. Adjusting the pathlength for the reference beam can be particularly advantageous if information about the interior of an object is to be collected. For instance, adjusting the pathlength of the reference beam by varying a position of a reference mirror can lead to interferogram data comprising data corresponding to different depth or partial depth positions in the coating. If the coating is at least partially transparent, based on the interferogram data a layer profile can be determined. The layer profile is indicative of interfaces between different layers of a coating. From the layer profile, a layer thickness can be derived as a width of a layer as represented by the layer profile as depth difference between two interfaces that are indicated by the layer profile, i.e., for instance, the width can be derived from a number of pixels belonging to the layer in a direction perpendicular to an interface as shown in the layer profile.

When the photosensitive medium is coupled to digital processing means, data representative of the interferogram, i.e. interferogram data, can be stored and/or further processed digitally. While in traditional holography, the interferogram in its analogue form would be used for optical reconstruction of an image of the object which the object beam has interacted with by shining a reconstruction beam on the photosensitive medium, the holographic interferogram data can similarly be used for reconstructing an image of the object digitally. This is the idea underlying digital holographic reconstruction techniques. Digital reconstruction techniques use the insight that the interference pattern is related to the Fourier transformation of the object, of which an inverse can be determined.

In preferred embodiments of the present invention, the holographic interferogram data comprise at least two sets of interferogram data, wherein each set is indicative of an interaction of coherent light of a different wavelength with the coating, and wherein the reconstructed holographic interferogram data comprise synthetic reconstructed holographic interferogram data. Herein, the term "synthetic" emphasizes that digital processing means are employed to calculate reconstructed holographic interferogram data that include information about a hypothetical interaction of light of a wavelength being a function of the actually employed at least two wavelengths—i.e. of light of a synthetic wavelength—with the coating. Preferably, the synthetic wavelength corresponds to a beat frequency of the—hypothetical—superposition of coherent light beams with the at least two different wavelengths. Hence, in the case of two different wavelengths, for instance, the synthetic wavelength may be their sum or their difference. A synthetic wavelength being larger than the wavelengths employed for recording the actual interferograms is particularly advantageous for examining coatings with depth variations at rather different scales, such as coatings with a fine surface structure interrupted by comparably large functional elements, or indeed, impact regions arisen from testing procedures. This is because the longer synthetic wavelength allows phase ambiguities to be avoided at larger structures while still maintaining a higher base resolution due to the actually employed smaller wavelengths.

The digitally reconstructed holographic interferogram data may simply be a digital image of the object, i.e. an image of the probe surface and the coating overlying it, for instance. In that case, the depth representation could simply be that image, represented in a suitably adapted coordinate system, in which, preferably, one axis points in the direction perpendicular to the probe surface. The increased resolution provided by digital holographic reconstruction would then be reflected in a very detailed and precise depth representation of the coating, for instance.

In some embodiments of the method, the depth representation comprises a topographic map of the coating surface. A topographic map carries full depth or penetration depth information, but no partial depth information, and is therefore not dependent on sensing values from the interior of the coating. Hence, a topographic map may even be determined for sensing values recorded by means unsuitable to sense an interior of the coating, as would be the case for optical sensing means and non-transparent coating materials.

In some embodiments of the method according to the present invention, deriving the coating property based on the topographic map comprises generating a depth histogram by counting, for each of a plurality of predetermined depth intervals, the number of probe surface points in the subset for which the coating depth indicated by the topographic map lies in the respective depth interval, and associating the counting results with the respective depth interval. Hence, the topographic map yields a depth histogram providing information about the distribution of depths across the coating. This has the advantage that objective characteristics of the coating become assessable in a reproducible manner. For instance, in the case of a coating surface perfectly planar and parallel to a reference plane with respect to which the coating depth is measured, the depth histogram would only comprise a single non-zero entry, corresponding to the number of points in the subset of probe surface points for which sensing data has been provided, wherein the number would be associated, via the histogram, to the interval of depth values into which the depth for which the provided sensing data is indicative falls. The predetermined depth intervals are preferably equal in size, their size determining a fineness, or coarseness, of the histogram. A minimum size of the depth intervals is reasonably chosen to be equal to a minimal distance between depths indicated by the sensing data, wherein the maximum size would be equal to a maximum distance between depths indicated by the sensing data. Advantageously, in order to retain an amount of information contained in the sensing data, the size of depth intervals of the histogram corresponds to a resolution characterizing the sensing data. The skilled person will understand that a coating having a regular thickness distribution, such as, for instance, a periodic pattern with a length of periodicity much smaller than a spatial extent of the portion of the coating for which sensing data are provided, will result in a rather flat depth histogram, i.e. a depth histogram for which the counting results associated to the majority of depth intervals are rather similar to each other, even though the periodic pattern in the coating may display large depth differences between different points. On the other hand, a coating geometry characterized by a large portion with a relatively high thickness and only a small portion with a substantially lower thickness will result in a depth histogram comprising correspondingly larger differences in counting results. In case of defects generated in the coating through mechanical impacts according to well-defined test procedures, the shape of the depth histogram can be employed for deriving properties of the coating with respect to the well-defined test procedure. However, even in more general cases of examining coatings unrelated to impact testing the depth histogram can be used for objectively obtaining structural characteristics of a coating.

In some embodiments, deriving the coating property based on the topographic map further comprises determining a peak depth interval indicative of a position of a local maximum in the histogram. In this way, a depth interval is identified that includes depth values frequently encountered, i.e. indicating a thickness of the coating present at many of the probe surface points for which sensing data have been provided. It is understood that the term "local maximum", since referring to a histogram, does not carry a meaning of spatial locality, i.e. does not describe a spatially local maximum in coating depth. Rather, the expression "local" indicates in relation to the depth histogram that the depth histogram may comprise more than one local maximum, i.e. other peaks, each separately corresponding to a count value higher than the count values corresponding to depth intervals in a neighborhood. Determining a position of a local maximum in the depth histogram is particularly advantageous for examining the coating, since it allows particularly meaningful properties of the coating to be derived. For instance, if a coating comprises two layers of different materials, and if this coating has been subjected to mechanical impacts of ballistic objects, such as done in the standard stone chip impact testing procedures, then the position of the local maximum represents the coating layer to which the coating has been damaged. In particular, different layers of the coating become distinguishable even if they do not differ in color. Identifying local maxima is also particularly advantageous for examining coatings without performing impact tests, since local maxima will generally be an indication of important structural features of the coating.

In some embodiments, determining the peak depth interval comprises the steps of providing a tolerance threshold value indicative of a base depth variety, computing count differences by subtracting counting results associated with selected depth intervals, determining the signs of selected count differences and/or comparing counting results associated with selected depth intervals, and determining the peak depth interval based on the provided tolerance threshold value, the computed count differences, and the determined signs and/or compared counting results. Preferably, these steps amount to computing a discretized derivative of the depth histogram and determining where it changes sign, wherein the depth interval where the discretized derivative changes sign is taken as a candidate position of a local maximum. If the counting results for all depth intervals in a neighborhood of the candidate peak position are smaller than the counting result associated to the depth interval corresponding to the candidate peak position, and if the counting result exceeds a predetermined base depth variety, then the candidate peak position is accepted as a true peak position. The base depth variety is a number of counts superseded for all, or substantially all, depth intervals.

In some embodiments, the coating property is being derived based on the determined peak depth interval. Since peaks in the histogram carry essential information about the depth variation of the coating, in this way this essential information is captured by the coating property. For instance, the coating property is simply chosen to be a depth value from the determined peak depth interval, such as a boundary or center value. In that case it will be particularly suitable for facilitating objective and reproducible examination.

In some embodiments, the coating property is indicative of a change in structure and/or material of the coating, and/or is indicative of a thickness of a coating layer. A change in structure and/or material will often occur at the interface between two layers of the coating. Preferably, more than one coating property is determined, so that, if more than one change in structure and/or material of the coating, i.e.

more than one interface between coating layers, is indicated by the more than one coating property, a relation between the interfaces can be determined. In particular, if the coating properties are depth values from two peak depth intervals, a layer thickness is estimated by their difference. Moreover, other coating properties can be derived based on a depth value indicated by the coating property.

In some embodiments, the method further comprises a step of assessing a mechanical resistance of the coating based on the derived coating property. In particular, the mechanical resistance can be assessed according to a standard classification, indicating a distribution of defects that is generated during a standardized testing procedure, as measured in terms of statistical characteristics such as an average defect depth or an average size of defects.

Particularly, the assessing comprises estimating a characteristic size of each of a plurality of regions in the coating based on the determined coating property. Preferably, the assessing is further based on the determined topographic map. For instance, a typical size of defects, i.e. impact regions stemming from impacts of ballistic objects in tests like the stone chip impact test, can be estimated by assigning each defect a size, i.e. a size as inferable from the topographic map, whereafter a typical size of defects is estimated from the plurality of sizes of the different defects. A measure for the size of a given defect is objectively obtained by, for instance, measuring its extent in a direction parallel to the probe surface at a depth value corresponding to the interface between two layers. This measurement can be performed using the topographic map if the derived coating property indicates the layer interface depth value. The direction parallel to the probe surface in which the measurement is taken can be, for instance, such that the measure is maximal, i.e. such that it coincides with the direction in which the defect has a maximal extent at the depth value indicated by the coating property.

More particularly, the regions can be indicative of mechanical impacts into the coating. As mentioned, such mechanical impacts preferably arise from standard testing procedures, such as the standardized stone chip impact test. It is understood that the regions are not necessarily the defect regions, i.e. the damaged portions of the coating, but can also comprise a non-damaged, intact portion of the coating.

In some embodiments, the coating is at least partially transmissive for the beam of light, wherein the holographic interferogram data are indicative of an interaction of the beam of light with an inner region of the coating, and wherein the depth representation comprises a layer profile indicative of interfaces between layers of the coating. In other words, due to the transmissivity of the coating, information about inner regions of the coating can be obtained. This can comprise, for instance, positions and shapes of interfaces between layers. A layer profile is therefore to be understood as any representation of information from the interior of the coating. For instance, it may comprise a cross-sectional visualization of the coating in a plane perpendicular to the coating surface. If the coating comprises more than one layer, interfaces may become visible in the layer profile. The layer profile can be determined, for instance, using digital holographic reconstruction techniques.

In some embodiments, the interaction comprises a phase jump in the beam of light, wherein an interface is indicated in the layer profile based on a detected phase jump. This manner of detecting layer interfaces is particularly preferred when it is known that the layer comprise differing refractive indices. This is because the phase associated with a beam of light going through a first layer with a first refractive index and being, at least partially, reflected at an interface towards a second layer with a second refractive index will experience a change of 180° if the second refractive index is higher than the first refractive index. The information about this phase jump will be encoded in the interferogram data and can be used, for instance, during a digital holographic reconstruction, to determine a particularly accurate layer profile.

In some embodiments, the coating property is a layer thickness, wherein deriving the layer thickness comprises estimating the layer thickness based on the layer profile, and correcting the estimated layer thickness based on a known refractive index of the layer. For instance, the refractive index of the first layer can be known from previous knowledge about the material of the first layer. Refractive indices are known for various materials from the literature. For particular materials it might be preferred that reference measurements are performed. The estimated layer thickness at a given probe surface point corresponds, for instance, to the difference between the full depth of the coating at that point and the partial depth of the interface between a first, topmost layer and a second layer, at that point. This can be directly determined from the layer profile by measuring an extent of, in this case, the first layer perpendicular to the coating surface, for instance by counting pixels. Preferably, the estimated layer thickness is corrected by multiplying it with the known refractive index.

In a further aspect of the present invention, a method for performing impact tests on a coating of a probe surface is presented, comprising the steps of shooting ballistic objects into the coating, cleaning the coating by removing the ballistic objects from it, collecting sensing data indicative of a depth of the coating at each of a predetermined subset of probe surface points, and examining the coating according to the previously described method.

In another aspect, an examining device for examining a coating of a probe surface is presented, the device comprising a providing unit for providing sensing data indicative of a depth of the coating at each of a predetermined subset of probe surface points, a determining unit for determining a topographic map of the coating from the sensing data, and a deriving unit for deriving a coating property based on the topographic map. The providing unit can be any piece of hardware adapted to provide the sensing data. For example, the providing unit can comprise general input means adapted to receive input data from a general type storage medium having the sensing stored thereon and to pass the input data on to the determining unit. Further, the providing unit can itself comprise storage means adapted to store the sensing data and pass them to the determining unit upon request or command. The determining unit and the deriving unit typically each comprise data processing means adapted to receive the sensing data and process them in a controllable manner. The determining unit and the deriving unit can share parts of the processing means, but can also be structurally entirely disjoint.

In another aspect, a system is provided that comprises a sensing device adapted to collect sensing data indicative of a depth of the coating at each of a predetermined subset of probe surface points, and an examining device for examining a coating of a probe surface. The sensing device preferably comprises holographic means, wherein the sensing data then comprise holographic interferogram data indicative of an interaction of a beam of light with the coating, wherein the beam of light is preferably an object beam. In some embodiments, the interaction is an interaction of the object beam with inner regions of the coating. The inner regions can comprise different layers of the coating, in which case it is preferred that the depth representation generated by the examining device comprises a layer profile. It can then be preferred that the holographic means comprise mirror means for adjusting the pathlength fora reference beam, wherein the adjusted pathlength is indicative of the inner region at which the interaction between object beam and coating has taken place for which the holographic interferogram data are indicative. In this way, multiple sets of holographic interferogram data are recorded, each being indicative of an interaction of the object beam with a different region in the coating. These embodiments are particularly preferred if the coating is transparent for the beam of light.

In yet another aspect, a system for performing impact tests on a coating of a probe surface is presented, comprising a ballistic device adapted to receive a multitude of ballistic objects, and shoot the ballistic objects at a predetermined test location, wherein the system is adapted to receive the probe at the predetermined test location and in an orientation such that the coating of the probe surface can be hit by the ballistic objects when the ballistic objects are being shot by the ballistic device, the system further comprising a cleaning device adapted to remove the ballistic objects from the coating, a sensing device adapted to collect sensing data indicative of a depth of the coating at each of a predetermined subset of probe surface points, and an examining device as previously defined.

A further aspect of the invention relates to a computer program for examining a coating of a probe surface, comprising instructions which, when the program is executed on a computer, cause the computer to carry out the method for examining a coating of a probe surface as previously defined.

In an aspect, the invention also relates to a computer program for performing impact tests on a coating of a probe surface, comprising instructions which, when the program is executed on a computer controlling the previously defined system, cause the system to carry out the method for performing impact tests on the coating of the probe surface as defined above.

It shall be understood that the method of claim 1, the method of claim 11, the examining device of claim 12, the system of claim 13, and the computer programs of claims 14 and 15 have similar and/or identical preferred embodiments, in particular as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereafter.

DETAILED DESCRIPTION OF EMBODIMENTS

Figure 1:
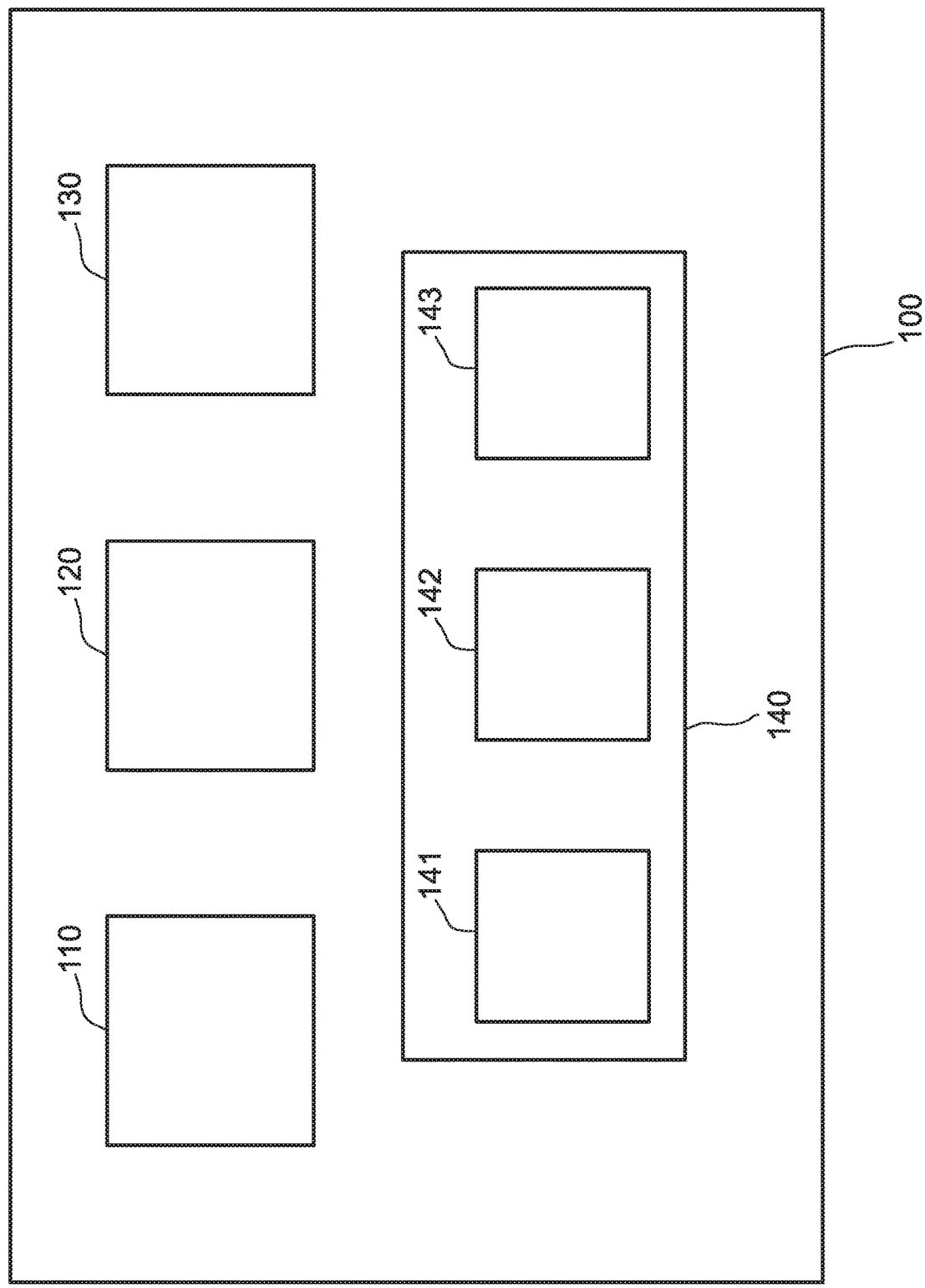
FIG. 1 shows schematically and exemplarily an embodiment of a system for performing impact tests on a coating of a probe surface according to the present invention.

FIG. 1 shows a schematic and exemplarily representation of a system for performing impact tests on a coating of a probe surface according to some embodiments of the present invention. The system 100 is preferably a single, automated system incorporating all devices necessary for automatically performing chip impact tests on a coating of a probe surface and afterwards collecting test results and performing suitable analysis thereof. Alternatively, the system 100 could also not combine all necessary devices at one place, in which case the method would not be automated completely but would necessitate human interaction, such as, for instance, a manual transfer of probes from one device to another and/or a manual controlling of the devices. For performing the impact tests, the system 100 comprises a ballistic device 110. The ballistic device is adapted to receive the ballistic objects which are to be used for the impact tests. Typically, the ballistic objects are steel or stone chips of a predetermined size and with a predetermined weight, wherein the size and the weight distribution of the chips can be subject to corporate or international standards. The ballistic device 110 receives the chips via a receptacle possessing an opening towards the interior of the device, such that a plurality of chips can be fed to the receptacle without having all of them transferred through the opening at once. Rather, the opening might be passed by the chips in a controlled manner and with a controlled speed, such that a predeterminable amount of chips reaches the interior of the ballistic device 110 at predeterminable time steps. The chips having reached the interior of the ballistic device are preferably being further fed to shooting means when the ballistic device is using the shooting means for shooting the chips at a predetermined test location. The shooting means may, for instance, be operable pneumatically, i.e. by air pressure, and are adapted to shoot the chips one by one with a configurable frequency and over a configurable time, wherein the chips reach the test location since the ballistic device is adapted to shoot them with an appropriate speed and into an appropriate direction. The system 100 is adapted to receive a probe at the test location in an orientation such that its surface faces the ballistic means of the ballistic device 110. Hence, once a probe is coated at its surface and located at the test location with its surface oriented towards the shooting means, the ballistic device 110 may be operated to shoot the chips onto and possibly into the coating of the probe surface. In this way the coating will generally be damaged.

The system 100 further comprises a cleaning device 120 that is adapted to remove the chips from the coating that are stuck therein after impact. For removing stone chips from the coating, the cleaning device 120 comprises, for instance, means for rolling a tape and for bringing the tape in contact with the coated probe located at the test location, and hence also for bringing the tape into contact with any chips stuck in the coating. The tape preferably comprises an adhesive such that when the tape is repeatedly brought into contact with the chips stuck in the coating and stripped off therefrom, the stone chips will adhere to the tape and can thereby be removed from the coating. Preferentially, removing the chips from the coating comprises several repetitions of bringing the tape into contact with the coating and subsequently removing it therefrom, wherein each repetition is followed by a translative movement of the tape, such that every repetition is performed with a fresh portion of tape.

System 100 further comprises a sensing device 130 that is adapted to sense the surface geometry of the coated probe. Preferably, the sensing device is an optical device. In this way, the geometry can be sensed contactlessly. If the coating surface is not transmissive in the frequency range of the light used for sensing, the sensed geometry will be confined to the surface geometry. If the coating surface is transmissive in the used frequency range, and if the rest of the coating is so as well, then sensing data can be obtained for positions inside the coating as well. The sensing device 130 will typically have a limited resolution, meaning that it will, in case it is an analog device, determine a distance below which no differences in sensing data can be detected, and in case it is a digital device, it will only collect a limited amount of data points. Calibration of the sensing device will determine the distribution of points at the test location, or on the coated probe surface, for which sensing data can be collected by the sensing device 130.

System 100 further comprises an examining device 140, such as a computer, that serves for analyzing the sensing data provided by the sensing device 130, and which is therefore adapted for examining the coating of the probe surface. The examining device 140 comprises a providing unit 141, such as an interface electronically coupleable to the sensing device 130, which is adapted for providing the sensing data. The providing unit may also be understood as a reading unit adapted to read sensing data stored on any storage medium and provide it for further analysis. The examining device 140 also comprises a determining unit 142, possibly realized by a processor of a computer 140, which is adapted for determining a depth representation of the coating based on the sensing data, and a deriving unit 143, which can be similar or identical to the determining unit 142, which is adapted for deriving a property of the coating based on the determined depth representation.

In applications unrelated to chip impact testing, such as quality control during an ongoing production process of depositing a structured coating on a film or foil, the sensing device 130 and the examining device 140 may alternatively be put to use independently from the rest of system 100, such as in the form of a holographic camera. In that case it is particularly preferred that the sensing device is adapted to collect optical sensing data from the interior of the coating, provided the coating is transparent for the light used for sensing. The sensing data are then indicative of interaction of the light with inner regions of the coating. This can be achieved, for instance, by adjusting the traveling distance for the reference beam using an additional slidable mirror. In this way the relative phase shift collected by a beam of light along its way through the coating can enter the sensing data and hence allow conclusions about the refractive index of layers at different partial depths. A change in refractive index can be interpreted by the examining device 140 as indicating the position of an interface between layers. Preferably, phase jumps of 180° arising during reflection of light at an interface towards an optically thicker layer are recognized. Based on such recognition of phase jumps in the sensing data provided by the providing unit 141, i.e., for instance, in the holographic interferogram data, the determining unit 142 may determine a layer profile of the coating. The determining unit 142 can be adapted to determine the layer profile using a standard technique for digital holographic reconstruction as known by the skilled person, wherein it may be preferred that the reconstruction is performed for a synthetic wavelength if the interferogram data comprise data for more than one actual wavelength. From the layer profile, as a coating property, a layer thickness may be derived by the deriving unit 143. For instance, a layer thickness, as derivable in the layer profile by, for instance, based on the number of pixels between two interfaces, may be corrected by multiplication with a corresponding refractive index known from previous, independent measurements.

Moreover, direct determination of layer thicknesses and/or interface positions, i.e. interface partial depths, from layer profiles generated by holographic means can also be applied in stone evaluating results of stone impact test, namely if the coatings are transparent or partially transparent. In that case, characteristic sizes of defects can be determined based on the location of layer interfaces directly determined from a layer profile.

Figure 2:
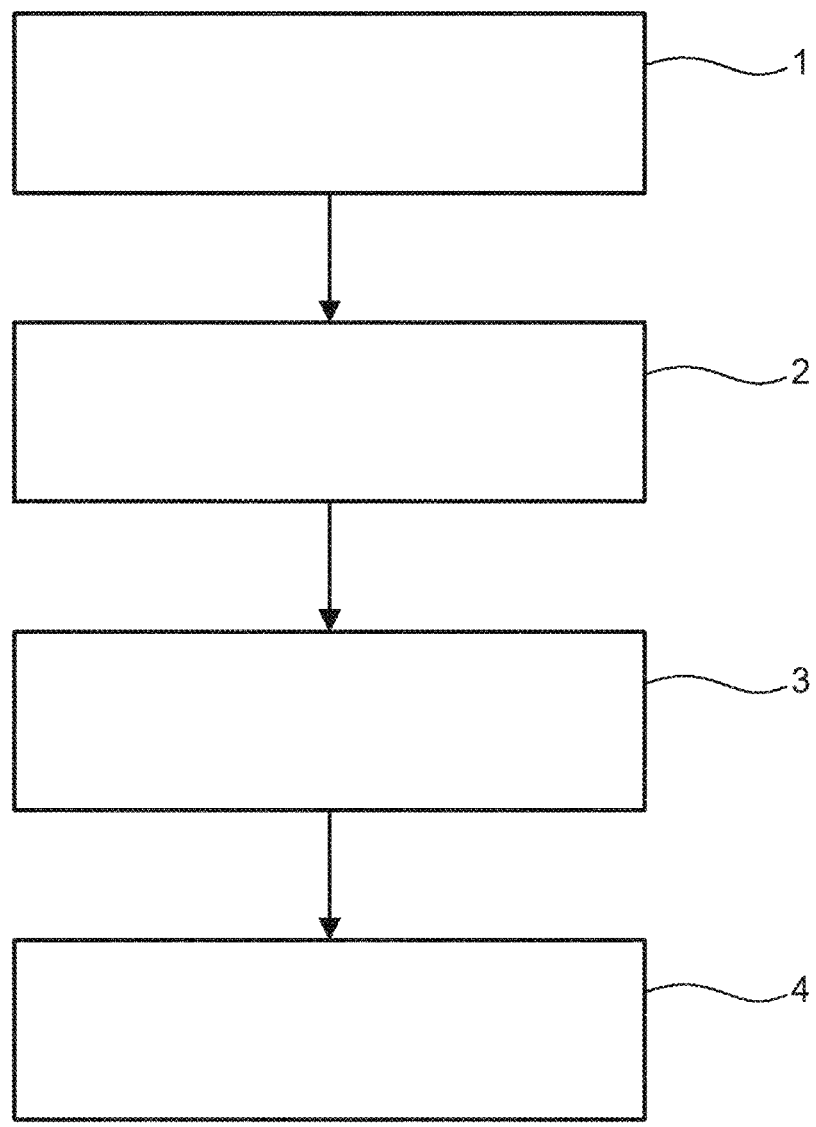
FIG. 2 shows schematically and exemplarily a flow chart illustrating a method for performing impact test on a coating of a probe surface according to the present invention.

FIG. 2 schematically illustrates how a system 100 as described in relation to FIG. 1 may be used for performing impact tests on a coating of a probe surface. The general procedure according to the invention is as follows: In a first step 1, ballistic objects are being shot into the coating using the ballistic device 110 of the system 100. Then, in a second step 2, the coating is being cleaned by removing the ballistic objects from it that have been shot into it and are stuck therein, using the cleaning device 120. Afterwards, in a third step 3, sensing data are being collected using the sensing device 130. In a fourth step 4, the cleaned coating is being examined using the examining device 140. Step 4 will subsequently be described in more detail with reference to FIG. 3.

Figure 3:
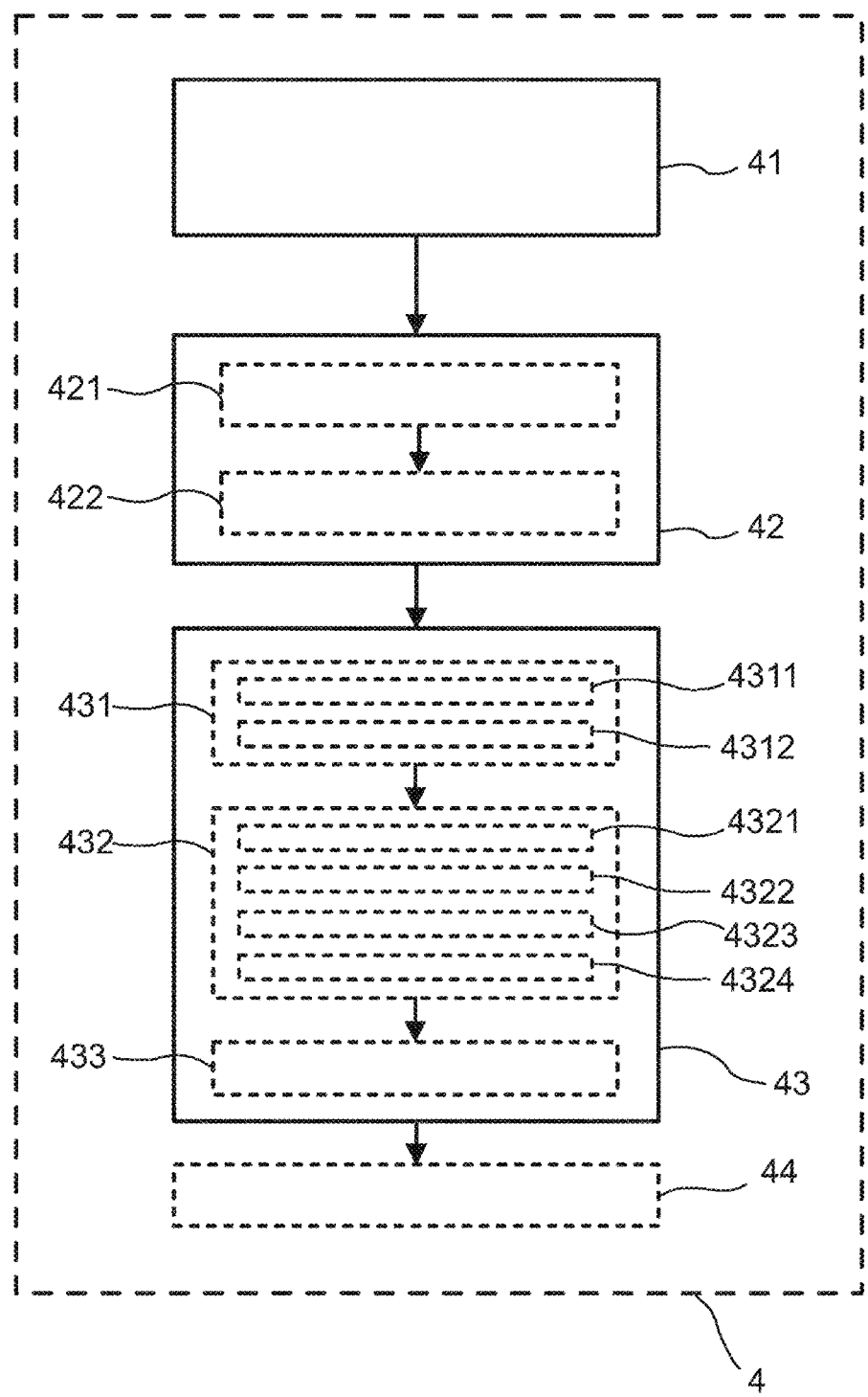
FIG. 3 shows schematically and exemplarily a flow chart illustrating steps performed for examining the coating in accordance with the present invention.

FIG. 3 shows a flow chart illustrating schematically and exemplarily the step of examining the coating as a method in its own, which could be executed using the examining device 140 previously described. Accordingly, a first step 41 consists in providing sensing data indicative of a depth of a coating at each of a subset of probe surface points. In a particular embodiment, the sensing data comprise a first and a second set of data, being representative of a holographic interferogram generated with a laser defined by a first and a second wavelength, respectively, and recorded using a photo-sensitive medium. The interferences encoded in the interferogram stem from phase modulations due to an interaction of a part of the laser beam with the coating, wherein this part, i.e. the probe beam, has been split by interferometric means from the original source laser beam, then brought to interact with the coating, and thereafter superposed again with the remaining part of the source beam serving as the reference beam. Since the phase modulations are different for different wavelengths, the corresponding interferograms, and therefore the two sets of holographic interferogram data will differ from each other, meaning that more information about the coating is provided than would be provided when using only interferogram data collected for a single wavelength.

In this embodiment, step 42 comprises a step 421 of calculating reconstructed holographic interferogram data by applying a digital holographic reconstruction to the holographic interferogram data that involves determining reconstruction data corresponding to a synthetic wavelength. The synthetic wavelength preferably corresponds to, i.e. is proportional to the inverse of, a beat frequency of a fictive superposition of a laser beam with the first wavelength and a laser beam with the second wavelength. It is particularly preferred that the synthetic wavelength is equal to the sum of the first and the second wavelength. In this way, large depth variations can be accurately and unambiguously determined without sacrificing short range resolution. Then, in a step 422, the depth representation of the coating is being determined based on the reconstructed holographic interferogram data. For instance, the depth representation is a topographic map, particularly a two-dimensional projection of a three-dimensional image arising from the reconstruction visualizing the geometry of the coating surface, wherein a Cartesian coordinate system could be imagined with a reference x-y plane coinciding with the probe surface underlying the coating, which is in this example assumed to be planar. In this configuration, the z-values of points on the coating surface are interpreted as full depths, i.e. thicknesses of the coating. In the preferred case of a digital holographic reconstruction resulting in reconstruction data corresponding to a synthetic wavelength exceeding the first and the second wavelength, both the microstructure of the coating surface as well as substantially larger geometric variations in coating thickness are resolved by the topographic map.

Preferably, damage by impact tests is controlled by means of the ballistic device 110 to be confined to a finite region of the coated probe surface, such as, for instance, a square area of 75 mm×75 mm. In many cases, only this square region will be shown by the topographic map. However, depth values can also be collected outside of the square region. A possibly slanted position of the coated probe surface can then be detected, namely by averaging depth values outside of the square at more than one, preferably at least three, positions, which can be positions at the corners of the probe, for instance. Then, all depth values, including those from inside the impact region and hence included in the topographic map, can be corrected for the slanted position.

In step 43, a coating property is being derived based on the depth representation. In the presently described embodiments, the depth representation comprises a topographic map, and step 43 in itself comprises step 431 of generating a depth histogram, step 432 of determining a peak depth interval indicative of a position of a local maximum in the histogram, and step 433 of deriving the coating property based on the determined peak depth interval. Step 431, in turn, comprises a step 4311 of counting, for each of the predetermined depth intervals, a number of probe surface points in the subset for which the coating depth indicted by the topographic map lies in the respective depth interval, and step 4312 of associating the counting results with the respective depth interval. In this particular embodiment, the predetermined depth intervals are chosen to have equal sizes, wherein the size is determined to be 1 µm, and wherein the number of depth intervals is taken to be equal to an estimated maximum coating depth, which corresponds to a depth of the coating in a region where it has not been damaged. Typically, in this way the number of depth intervals is at least 100, since damages to the coating arising from impact test are expected to lead to a reduced depth of the coating in the impact regions by up to 100 µm. Counting is then performed by going through all points in the topographic map and deciding for each of them whether the depth associated to it lies within a given depth interval. Deciding whether a depth value lies within a given depth interval comprises comparing the depth value to the boundaries of the depth interval. For instance, it is decided that the depth value lies within the depth interval if it is greater or equal to the lower boundary of the depth interval but less than the upper boundary of the depth interval. In this way, the decision can be made correspondingly for all depth intervals without risking that there are any depth values that are not represented in the depth histogram.

In the context of chip impact tests, the depth values may be penetration depth values $d_p$, i.e. indicative of a deviation between a coating thickness at a given probe surface point and an intact coating depth. The intact coating depth may correspond to a coating thickness outside the impact region. Penetration depths can also be determined without knowledge about the actual coating thickness, but simply by determining the difference between the value $z_0$ of the z-coordinate corresponding to the intact coating surface, possibly corrected for a slanted probe position as previously described, and the value of the z-coordinate of the coating surface at the respective point, i.e. $d_p = z_0 - z$. Preferably, only penetration depth values with an absolute value beyond a predeterminable roughness level are taken into account by setting a corresponding margin around $z_0$ in both directions. The size of this margin can be set manually or automatically. When set automatically, it is preferably learned from a reference pattern, such as a reference probe, and thereafter applied to all further probes. In impact testing, the margin can also serve for ignoring impacts of chips that have been bounced off the coating surface without substantially damaging. The margin will generally depend on the type of coating and can range from values as small as 0.5 µm for a small ignorance levels to values as high as 5 µm for transparent coatings, like clearcoats.

Step 432 of determining a peak depth interval indicative of a position of a local maximum in the histogram comprises, in this particular embodiment described with reference to FIG. 3, step 4321 of providing a tolerance threshold value indicative of a base depth variety, step 4322 of computing count differences by subtracting counting results associated with selected depth intervals, step 4323 of determining signs of selected count differences and/or comparing counting results associated with selected depth intervals, and step 4324 of determining the peak depth interval based on the provided tolerance threshold value, the computed count differences, and the determined signs and/or compared counting results. In this embodiment, the tolerance threshold serves for eliminating a base level, i.e. a number of counts nearly detected for substantially all depth intervals, and is determined automatically. Its presence is due to the generally non-uniform shape of the defects. In other embodiments, the tolerance threshold is set manually. Step 4322 uses preferably standard techniques for determining the discrete derivate of a function, wherein the function is in this case given by the counting results in dependence on the coating depth. Step 4323 is in this embodiment realized by detecting between which two adjacent depth intervals the sign of the discrete derivative of the counting results, i.e. the count differences, changes, wherein detecting is only executed for depth intervals associated with counting result exceeding the provided tolerance threshold. Once a peak depth interval is determined, a coating property is derived based on it in step 433. Assessing 44 the coating can then be performed based on the derived coating property. The coating property indicates preferably a change in structure and/or material of the coating. This is because ballistic objects shot at and into the coating will leave defects therein that preferably display a depth corresponding to a change in structure and/or material in the coating, such as possibly given by an interface between two coating layers. A first type of defects leads to sharp peaks due to a distinguished off-chipping of coating material at layer interfaces. A second type of defects leads to broader peaks in the histogram. This second type of defects arises if the ballistic objects enter the coating material in a more digging manner, displaying greater parts of the layers along the defect walls.

Preferably, the coating comprises a thin surface layer, a first major defect layer underlying the surface layer, and a second major defect layer underlying the first major defect layer. In that case, the histogram comprises three peak depth intervals, wherein a first peak depth interval is indicative of the surface layer of the coating, the second peak depth interval is indicative of the first major defect layer and the third peak depth interval is indicative of the second major defect layer of the coating. A coating property can then be derived as an interface partial depth value indicative of a position at which a transition occurs between, for example, the first major defect layer and the second major defect layer. In particular embodiments, a characteristic size can be estimated for each defect by measuring its extent, in the topographic map, in a direction parallel to the probe surface and at a depth corresponding to the determined interface partial depth. The characteristic sizes of the plurality of defects can be statistically analyzed, wherein the statistical analysis can be used for assessing a mechanical resistance of the coating according to standard reference values. For instance, such a standard reference value might depend on an average characteristic size of the plurality of defects. It may further, additionally or alternatively, depend on a total fraction of damaged area of the coating surface. An estimate for the damaged area might be given by the total number of points attributed to a defect. This number can be estimated based on the depth histogram as well, namely by summing counting results associated to peaks. Counting results may be associated to peaks if they are associated to a depth interval lying within a predetermined range around the corresponding determined peak depth interval indicative of the maximum of the peak. For instance, counting results can be included if they lie within a 6σ range of a peak, a denoting the standard variation. Other ranges can however also be applied, possibly learned from model systems. Also, it is possible that only those counting results are included that are associated to a depth interval indicative of a position beyond a determined interface partial depth.

Figure 4:
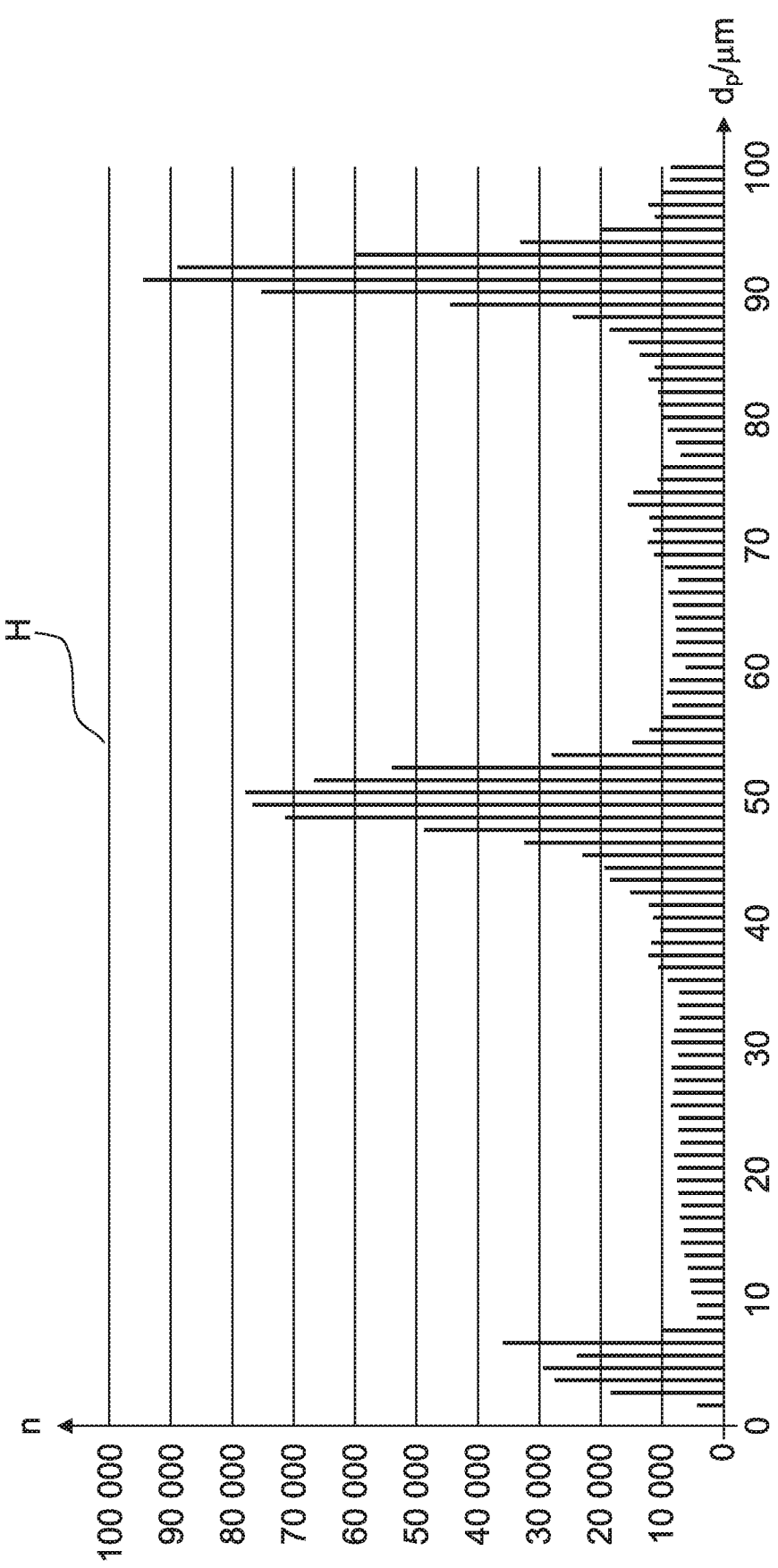
FIG. 4 shows an exemplarily depth histogram as generated for examining the coating in an embodiment of the invention.

FIG. 4 shows an exemplary depth histogram H in accordance with the embodiment described with respect to the previous Figures. The horizontal axis indicates a penetration depth $d_p$ into the coating in units of 1 μm, and the vertical axes indicates the coating results n, i.e. the number of points in the predetermined subset of probe surface points for which sensing data have initially been provided indicative of the respective penetration depth. For instance, approximately 10.000 points exist on the examined portion of the coating for which a penetration depth of 7±0.5 μm has been determined. The histogram H displays three maxima, of which two are strongly pronounced, while a first maximum has a peak value that is substantially lower. The respective peak depth intervals lie between 2 μm and 6 μm for the first peak, between 45 μm and 57 μm for the second peak, and between 87 μm and 98 μm for the third peak. Between the peaks, a threshold value of approximately 17.000 counts is not exceeded. At the same time, counting results also nowhere approach 0 in the displayed range of penetration depths. This base level of counts between 0 and 17.000 can be understood as irrelevant for deriving the coating property, and could therefore be eliminated by setting the tolerance threshold to be equal to 17.000.

Figure 5:
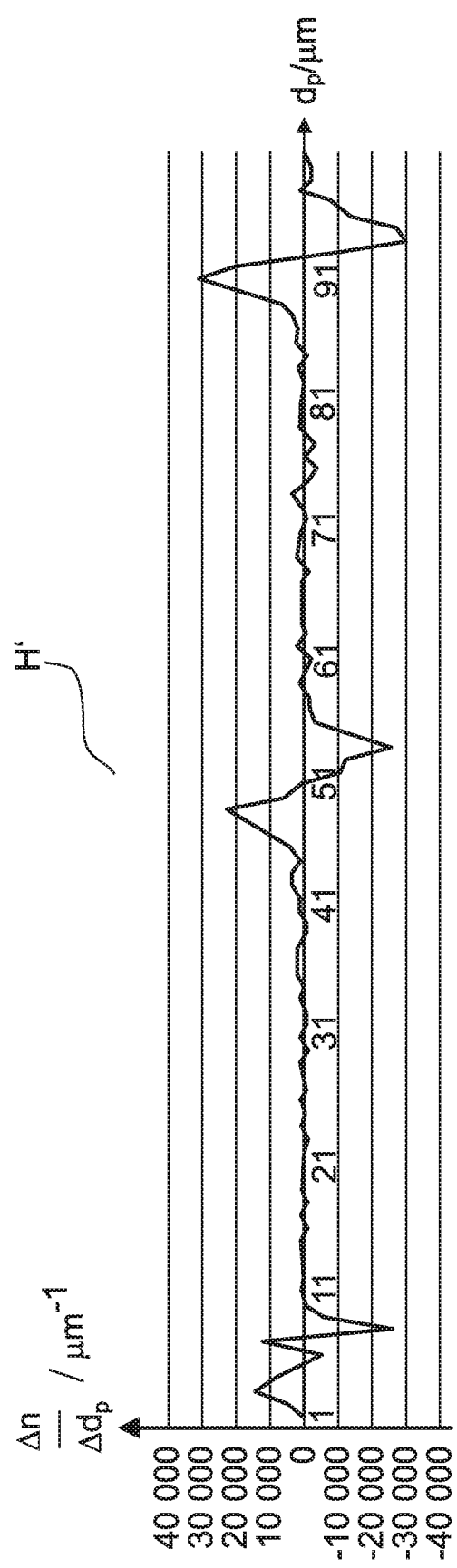
FIG. 5 shows an exemplarily graph of a derivative of a depth histogram as illustrated by FIG. 4.

FIG. 5 illustrates the discrete derivative H' of the histogram H of FIG. 4. Again, the horizontal axis indicates the penetration depth $d_p$ in μm, while the vertical axis now measures how the counting results n change from one penetration depth interval to the next. This change, denoted by $\Delta n/\Delta d_p$, is measured in units of inverse micrometres, $\mu m^{-1}$. The second and third maxima are rather easily detected based on the clearly distinguishable sign changes of the discrete derivative at about 51 μm and about 92 μm, respectively, wherein in both cases the sign changes from plus to minus. In order to determine the first peak depth position two penetration depth values serve as candidates, namely a value of about 5 μm and a value of about 7 μm, since at both of these values the sign of the discrete derivative changes from plus to minus. The true peak depth interval position is in this case calculated by averaging, i.e. leading to 6 μm in this case. In other embodiments, the true peak depth interval position is determined by fitting an analytical peak function, possibly Gaussian shaped, to the counting results in a neighbourhood of the peaks, and the peak position is estimated as the position of the maximum of the analytical peak function.

Figure 6:
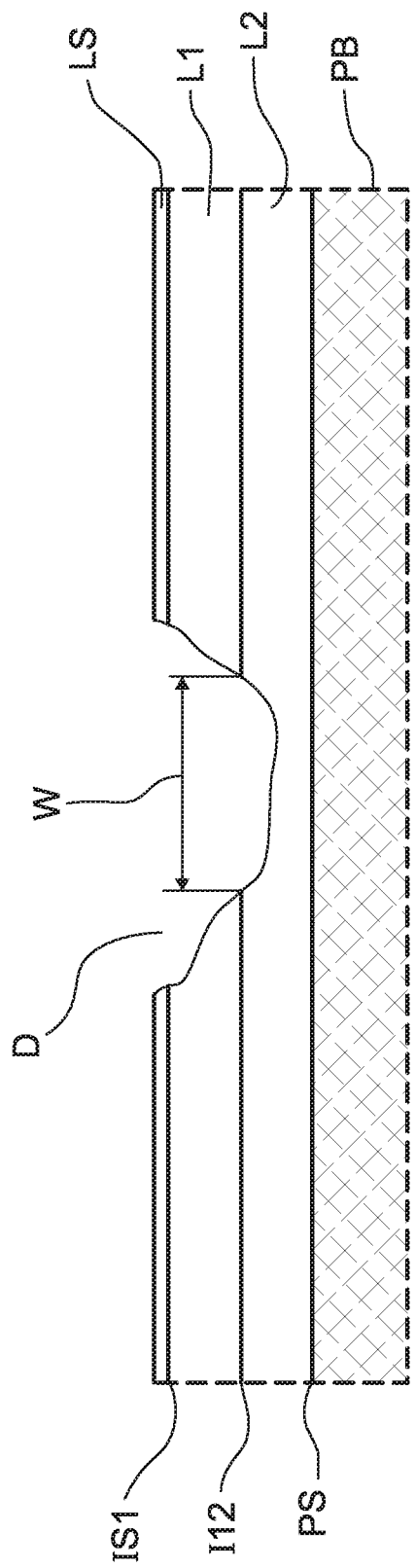
FIG. 6 shows a schematic and exemplary illustration of an impact region in a coating of a probe surface.

FIG. 6 illustrates a cross-section through an exemplary portion of a probe covered with a multi-layer coating having a defect due to impact of a chip during a chip impact testing procedure. FIG. 6 could also be viewed as a schematic visualization of a layer profile as determined based on sensing data also from the interior of the coating and, in this case, also the probe. The probe comprises a bulk part PB and a probe surface PS. The coating overlies the probe surface PS and comprises three layers. The top layer is a comparably thin surface layer LS. Underneath, a first main layer L1 and a second main layer L2 follow, wherein the surface layer LS and the first main layer are divided by an interface IS1. In this example, the first main layer L1 is sandwiched between the surface layer LS and the second main layer L2, the second layer having direct contact with the probe surface PS. The defect D affects all three layers. In other examples, the coating may comprise further layers, the lower ones lying deep enough not to be affected by chip impact. Since in the example shown in FIG. 6 the first main layer L1 and the second main layer L2 are both substantially affected, they could also be called first and second major defect layer, respectively. A characteristic size of the defect D is assumed to be given by its width w, as measured in the cross-sectional plane and along the interface 112 between the first main defect layer L1 and the second main defect layer L2. The location, i.e. partial depth, of the interface is known either from the respective peak depth interval determined from a depth histogram, or, in the case of transparent or partially transparent coatings, from the layer profile, as explained above. The cross-sectional plane in which W is measured might be chosen, according to corporate conventions, for instance, such that W is maximal. Optionally, W might further be corrected to $W'=(W+W_{perp})/2$, wherein $W_{perp}$ is the maximal extent of the defect as measure along the interface 112 in the cross-sectional plane perpendicular to the original one. A defect is then sorted, again by convention, into a severeness class defined by given threshold values. For example, a defect with $W^{()} \leq 1$ mm will be classified into the lowest severeness class, while a defect with 1 mm$<W^{()} \leq 1$ mm will already be classified more severe. The distribution of severeness classes over all defects, possibly approximately parametrized by a mean severeness class and/or a standard variation, accurately measures the resistance of the tested coating against chip impacts. Its characteristics can serve for assessing 44 a mechanical resistance of the coating.

Although the embodiments described above with references to the Figures referred an application of the invention for examining coatings with respect to impacts arisen from impact testing procedures and using digital holographic techniques, it is understood that the same or similar principles can also be applied for other purposes and with different means. In particular, the disclosed method is not limited to be used in conjunction with holographic imaging techniques, but can likewise make use of other means for providing sensing suitable for determining a depth representation. Such means specifically include profilometric and deflectometric measurement and/or imaging systems. Also, it will be appreciated that the method finds applications also for monitoring on-going production processes in which structured coatings are applied to films or foils, or for assessing results thereof, such as whether the particular coating structure desirable for obtaining a certain functionality has been achieved. In particular, although determining a depth histogram has been proposed only in relation with stone impact test, it is understood that depth histograms as referred to herein will also be of advantage in other types of examinations of coatings by deriving objective characteristics therefrom. On the other hand, it is to be noted that in impact tests performed for transparent or partially transparent coatings, such as clearcoats, additionally or alternatively to determining a depth histogram from a topographic map of the coating, coating properties like the position of layer interfaces may also be derived from a layer profile.

Other variations to the disclosed embodiments can be understood and effected by those skilled in the art and practising the claimed invention from the study of the drawings, the disclosure, and the appended claims.

In the claims, the word "comprising" does not exclude other elements or steps, and the indefinite articles "a" or "an" does not exclude a plurality.

| BASF SE | 190149 | 190149 |

A single unit or device may fulfill the functions of several items to be cited in the claims. The mere fact that certain measures are recited in mutually different dependent claims does not indicate that a combination of these measures cannot be used to advantage.

Procedures like the providing of sensing data, the determining of a depth representation of the coating from the sensing data, as well as the deriving of a coating property based on the depth representation, but also procedures like the shooting of ballistic objects into a coating, cleaning the coating, and the collecting of sensing data, described as performed by one or several units or devices, can be performed by any other number of units or devices. These procedures and/or the operations of the system can be implemented as instructions of a computer program and/or as dedicated hardware.

A computer program may be stored and/or distributed on a suitable medium, such as an optical storage medium or a solid state storage medium, supplied together with or as part of other hardware, but may also be distributed in other forms, such as via the internet or other wired or wireless communication systems. Any reference signs in the claims should not be construed as limiting the scope.

The invention claimed is:

1. A computer-implemented method for examining a coating of a probe surface, the method comprising using an examining device comprising a processor in communication with a memory to perform the steps of receiving sensing data indicative of a depth of the coating at each of a predetermined subset of probe surface points, determining a depth representation of the coating from the received sensing data, wherein the determined depth representation comprises a topographic map of the coating of the probe surface, and deriving a coating property based on the topographic map, wherein deriving the coating property based on the topographic map comprises:

generating a depth histogram (H) by:

a) counting, for each of a plurality of predetermined depth intervals, a number of the probe surface points in the subset for which the coating depth indicated by the topographic map lies in the respective depth interval, and b) associating the counting results with the respective depth interval.

2. The method according to claim 1, wherein the sensing data comprise holographic interferogram data indicative of an interaction of a beam of light with the coating.

3. The method according to claim 2, wherein the step of determining the depth representation comprises calculating reconstructed holographic interferogram data by applying digital holographic reconstruction to the holographic interferogram data, and determining the depth representation of the coating based on the reconstructed holographic interferogram data.

4. The method according to claim 3, wherein the coating is at least partially transmissive for the beam of light, wherein the holographic interferogram data are indicative of an interaction of the beam of light with an inner region of the coating, and wherein the depth representation comprises a layer profile indicative of interfaces between layers of the coating.

5. The method according to claim 4, wherein the interaction comprises a phase jump in the beam of light, and wherein an interface is indicated in the layer profile based on a detected phase jump.

6. The method according to claim 5, wherein the coating property is a layer thickness, wherein deriving the layer thickness comprises estimating the layer thickness based on the layer profile, and correcting the estimated layer thickness based on a known refractive index of the layer.

7. The method according to claim 1, wherein deriving the coating property based on the topographic map further comprises determining a peak depth interval indicative of a position of a local maximum in the depth histogram (H).

8. The method according to claim 7, wherein the coating property is derived based on the determined peak depth interval.

9. The method according to claim 1, wherein the coating property is indicative of a change in structure and/or material of the coating and/or is indicative of a thickness of a coating layer.

10. The method according to claim 1, further comprising a step of assessing a mechanical resistance of the coating based on the derived coating property, wherein the assessing comprises estimating a characteristic size of each of a plurality of regions in the coating based on the derived coating property, the regions being indicative of mechanical impacts into the coating.

11. A method for performing impact tests on a coating of a probe surface, comprising the steps of
　shooting ballistic objects into the coating,
　cleaning the coating by removing the ballistic objects from the coating,
　collecting sensing data indicative of a depth of the coating at each of a predetermined subset of probe surface points, and
　examining the coating according to the method of claim 1.

12. The method according to claim 1, wherein the examining device receives the sensing data from a sensing device adapted to sense surface geometry of the coating of the probe.

13. An examining device for examining a coating of a probe surface, comprising a processor in communication with a memory, and further comprising:
　a providing unit configured for receiving sensing data indicative of a depth of the coating at each of a predetermined subset of probe surface points,
　a determining unit configured for determining a depth representation of the coating from the sensing data, wherein the determined depth representation comprises a topographic map of the coating of the probe surface, and
　a deriving unit configured for deriving a coating property based on the topographic map, wherein deriving the coating property based on the topographic map comprises:
　　generating a depth histogram (H) by:
　　　a) counting, for each of a plurality of predetermined depth intervals, a number of the probe surface points in the subset for which the coating depth indicated by the topographic map lies in the respective depth interval, and
　　　b) associating the counting results with the respective depth interval.

14. A system for performing impact tests on a coating of a probe surface of a probe, comprising
　a ballistic device adapted to,
　　receive a multitude of ballistic objects, and
　　shoot the ballistic objects at a predetermined test location, wherein the system is adapted to receive the probe at the predetermined test location and in an orientation such that the coating of the probe surface can be hit by the ballistic objects when the ballistic objects are shot by the ballistic device,
　a cleaning device adapted to remove the ballistic objects from the coating,
　a sensing device adapted to collect sensing data indicative of a depth of the coating at each of a predetermined subset of probe surface points, and
　the examining device according to claim 13.

15. The examining device according to claim 13, wherein the examining device receives the sensing data from a sensing device adapted to sense surface geometry of the coating of the probe.

* * * * *